United States Patent

Hegemann et al.

[11] Patent Number: 5,916,649
[45] Date of Patent: Jun. 29, 1999

[54] HIGHLY HEAT-RESISTANT MOLDINGS

[75] Inventors: Klaus Hegemann; Konrad Schmitz, both of Lippstadt, Germany

[73] Assignee: Hella KG Hueck & Co., Germany

[21] Appl. No.: 08/676,346

[22] PCT Filed: Jan. 13, 1995

[86] PCT No.: PCT/EP95/00120

§ 371 Date: Sep. 5, 1996

§ 102(e) Date: Sep. 5, 1996

[87] PCT Pub. No.: WO95/20129

PCT Pub. Date: Jul. 27, 1995

[30] Foreign Application Priority Data

Jan. 22, 1994 [DE] Germany .............................. 44 01 813

[51] Int. Cl.$^6$ ........................... B29D 22/00; B29D 23/00; B32B 1/08
[52] U.S. Cl. ..................... 428/36.92; 428/34.1; 524/494; 524/492; 524/493
[58] Field of Search ...................................... 524/492, 493, 524/494, 439, 440, 441, 434, 435, 436; 523/466; 428/34.1, 36.92

[56] References Cited

U.S. PATENT DOCUMENTS

| | | | |
|---|---|---|---|
| 5,043,369 | 8/1991 | Bahn et al. | 523/466 |
| 5,256,604 | 10/1993 | Aitken | 501/45 |

FOREIGN PATENT DOCUMENTS

| | | |
|---|---|---|
| 0365236 | 4/1990 | European Pat. Off. . |
| 0459229 | 12/1991 | European Pat. Off. . |
| 0523497 | 1/1993 | European Pat. Off. . |
| 0566866 | 10/1993 | European Pat. Off. . |
| 02640189 | 6/1990 | France . |

*Primary Examiner*—James J. Seidleck
*Assistant Examiner*—U. K. Rajgurn
*Attorney, Agent, or Firm*—Baker & Botts, L.L.P.

[57] ABSTRACT

Molded articles preferably for use in a vehicle as a headlamp reflector, lamp socket, shader of vehicle lamp, or vehicle headlamp, and that are highly resistant to heat are disclosed. The molded articles of the present invention include from 70 to 95% (by weight) of an inorganic filler, which is a liquid at the molding temperature and a solid at room temperature, and a thermoplastic binder. The molded article is produced by either injection molding or transfer molding.

10 Claims, No Drawings

HIGHLY HEAT-RESISTANT MOLDINGS

The invention relates to highly heat-resistant moldings of vehicle lamps or headlamps produced by injection molding and/or transfer molding and the process for the preparation of such moldings.

Vehicle lamps and headlamps are composed of a multitude of moldings which are subjected to increased heat load with increasing reduction in size of the components. In particular, hollow reflector bodies for lamps are subjected to extremely high heat loads due to the smaller-sized construction of vehicle lamps and/or headlamps, corresponding to the designers' requirements. Legal regulations, however, require extreme accuracy and stability of the radiation power and radiation direction adjusted. Accordingly, it is required that highly heat-loaded moldings of vehicle lamps and/or headlamps meet a number of minimum criteria in order that they can be employed according to their intended purpose. Thus, for example, an extreme mechanical dimensional stability of the moldings is required which results in a high accuracy of reflection. This may be exemplified by reflectors of headlamps which are allowed virtually no deformation even under the action of heat since otherwise the direction of radiation, for example, the inclination angle of the dipped headlights, is changed. Also, the impact resistance of the materials has to meet high requirements because such impacts cannot be excluded during the operation and repair of a vehicle lamp or headlamp.

In addition, in order to ensure the special high level of the accuracy of reflection, in particular when adjusting the reflector to the vehicle loading, a high dimensional stability of the inserted moldings is required.

Due to the high emission of heat, especially by lamps, in particular vehicle lamps and headlamps with high luminous powers, a high heat load occurs in various components of a vehicle lamp or headlamp. Accordingly, a great heat-resistance is a precondition for highly heat-loaded moldings. As a rule, thermoplastic materials are less suitable due to the softening which occurs at higher temperatures since their heat resistance is usually not sufficient. In addition, it is also required that the coeffcient of thermal expansion of the materials be as low as possible for ensuring the accuracy of reflection. Another criterion which must be met in the preparation of highly heat-resistant moldings for vehicle lamps and headlamps is a low mold shrinkage of the materials to be employed in order that a highly reproducible series production with high production accuracy can be performed.

In order to meet all those requirements, metallic moldings, e.g. reflectors, have frequently been used until today which in turn involve drawbacks in terms of metal processing technology. Accordingly, for headlamp reflectors made of plastics, in particular those according to ECE regulations, only molding materials are suited having a high dimensional stability, that is extremely low mold shrinkage, extremely low coefficient of linear expansion ($\alpha$ value), while having sufficiently high mechanical strength. As a rule, these requirements cannot be met by thermoplastic materials so that especially thermosetting materials have prevailed in the prior art. In addition, especially with reflectors, there is always a desire for a high surface quality of a direct metal-coating meeting the optical requirements and an extremely low degassing rate for avoiding critical scaling on the functional surfaces, i.e. especially of the reflecting surface of the headlamp.

The best prerequisites for high dimensional stabilities, low $\alpha$ values and low degassing rates are presented, in principle, by organic, especially thermosetting molding materials having high contents of mineral fillers. However, with increasing filler content, limits are set to direct vapor deposition meeting the functional requirements so that a coating prior to metal-coating becomes necessary. Moreover, per se known molding materials having high contents of mineral fillers are extremely difficult to process since the flowability of such materials is relatively poor. Thus, DE 10 28 053 B1 describes metal-coated reflector carriers made of molded plastics containing fillers, in particular for automotive headlamps, wherein the reflector carrier, which is metal-coated in a known manner by vapor-depositing a metal coat, especially aluminum coat, in a vacuum, consists of an intimate mixture of a fine-grained inorganic filler, especially rock meal, with the cured synthetic resin, especially a phenol/formaldehyde resin. In preferred embodiments, there is stated that the reflector is to be prepared by hot-press molding shaped synthetic resin compounds with about 55–45% of rock meal and 45–55% of cured phenol/formaldehyde resin. For the technical realization of highly heat-resistant moldings of vehicle lamps or headlamps of the present generation, however, it is required to provide the surface, especially the functional surface, with a smoothing coat prior to metal-coating since the surface accuracy of the moldings filled with mineral filler particles no longer meets the current requirements.

From DE 22 44 921 B2, there is known a process for the preparation of a hollow reflector body for lamps formed from a glass-fiber reinforced thermosetting polyester casting compound the interior surface of which is provided with a reflecting material consisting of a thermosetting polyester casting compound with 1–2% by weight of mold release agent and 12–18% by weight of glass fibers. From the prior art referred to here, a number of additional materials have been known, in particular for the preparation of hollow reflector bodies for lamps from glass-fiber reinforced casting resins. Direct metal-coating is not possible here, either, since the fillers and glass-fibers impart a relatively rough surface to the hollow reflector body for lamps which is not suited for a high reflection quality.

Another drawback of the highly heat-resistant moldings based on thermosetting plastics known from the prior art arises, in particular, from the relatively long cycle times of the production. The curing of the casting compounds requires relatively long reaction times, for example, reactions times in the range of minutes, so that in practice cycle times of less than 60 s are often hardly realizable.

Accordingly, there is a need for highly heat-resistant moldings of vehicle lamps or headlamps which are prepared by injection-molding wherein said moldings are to exhibit the essential ones of the above-mentioned properties of conventional moldings of metallic or thermosetting origin. In addition, there is also a need in the preparation of reflecting moldings of vehicle lamps or headlamps in that they have a high surface quality enabling direct metal-coating without any intermediate coating. Highly heat-resistant moldings of vehicle lamps or headlamps without reflecting functional surfaces should be available within as short as possible cycle times, for instance, in the range of essentially less than one minute, in view of the cycle times of today's automobile construction. Of course, reasonable prices of the moldings are also of extremely high importance.

All of the above-mentioned requirements or objects are achieved in a first embodiment of the invention by highly heat-resistant moldings of vehicle lamps or headlamps produced by injection molding and/or transfer molding, characterized in that the molding compound contains a mixture of an inorganic filler (A) which is liquid at the molding temperature and solid at operating temperature, and a thermoplastic binder (B).

By means of the present invention, highly heat-resistant moldings of vehicle lamps or headlamps can be obtained by injection-molding which also meet the more recent ECE regulations. The moldings have high dimensional stability, that is extremely low mold shrinkage, extremely low coefficient of linear expansion ($\alpha$ value), while having sufficiently high mechanical strength. In addition, the requirements of a high surface quality for direct metal-coating meeting the optical requirements and an extremely low degassing rate for avoiding critical scaling on the functional surfaces, especially of the reflecting surfaces of the headlamp, are met.

Correspondingly, a filler (A) is preferably employed having a density at 20° C. of at least 3 g/cm$^3$ and in particular a coefficient of thermal expansion of less than or equal to $30 \times 10^{-6}$/K wherein as low as possible a coefficient of thermal expansion is of special importance. In principle, it may also be conceived to employ metals having densities of less than 2 g/cm$^3$.

In order to achieve the above objects, it is especially preferred according to the present invention to select the filler (A) from inorganic materials which are low-melting and glassy and/or will solidify to a crystalline state, in particular low-melting glasses, metals and/or metal alloys. A precondition for employing the corresponding materials is their being capable of being processed by injection-molding and/or transfer molding in the presence of a thermoplastic binder (B). If the melting temperatures of the fillers (A) to be employed are too high, the thermoplastic binder (B) will decompose in the injection-molding and/or transfer molding so that the functions of this binder (B) cannot be fulfilled sufficiently. If, on the other hand, a filler (A) is employed having a very low melting point, the heat-resistance of the moldings required according to the present invention is not provided so that a practical application of the moldings at a high heat load is not possible. Accordingly, it is especially preferred according to the present invention to employ low-melting inorganic glasses having a melting range within the range of from 230 to 450° C. as the filler (A), in particular from 320 to 350° C. A corresponding filler (A) in combination with a thermoplastic binder (B) is commercially available under the trade mark of CORTEM™. In CORTEM™, a low-melting alkali metal zinc phosphate glass is employed as a reinforcement and filler. This glass is in the form of a low-viscous melt during the normal injection molding process. Thus, the increase in viscosity with increasing filler content which is usually encountered with polymer melts does not occur when such low-melting fillers (A) are used. Similarly, a low-melting zinc sulfide glass may also be employed according to the invention.

Whereas usually a high filler content results in a coarse graining and thus in a rough surface, it is possible according to the present invention to introduce the filler (A) in the mold in a liquid form so that an extremely smooth surface can be produced. Accordingly, a direct vapor-deposition which meets the functional requirements is possible even with extremely high filler contents.

An essential criterion in the selection of the thermoplastic binders (B) is the heat-resistance at the molding temperature and the heat-resistance in the later use in the molding prepared. In addition, a good adhesion of the polymer to the solid inorganic filler (A) is required. Therefore, thermoplastics with high deflection temperatures according to the present invention are preferably selected from liquid crystal polymers (LCP), linear cellulose propionate (LCD), polyether ketones (PEK), polyetherether ketones (PEEK), polyether sulfones (PES), polyether imides (PEI) and/or polyphenylene sulfides (PPS). The above-mentioned thermoplastics exhibit an excellent adhesion to the low-melting alkali metal zinc phosphate glass.

From REM micrographs, it could be established that the formation of a compatible phase at the glass/polymer interface is very likely. The formation of a fine morphology allows for a direct coating which meets the functional requirements even with extremely high filler contents, depending on the compounding and processing technique.

The deflection temperature of the materials thus obtained is possibly about 300° C., depending on the materials employed. The continued use temperature of thermoplastics is about 280° C., while with thermosetting plastics, such as the wet polyesters mentioned, from 75 to 80% by weight are typical. The modulus of elasticity, the mold shrinkage and the coefficient of thermal expansion are dependent on the filler content and may be easily optimized by those skilled in the art of headlamp applications by varying the proportions.

Accordingly, in a special embodiment of the present invention, the moldings predominantly consist of the filler (A) and in particular of from 50 to 95% by weight, preferably from 70 to 95% by weight. Whereas with prior art fillers (A) maximum filler contents of 50 to 60% by weight are possible, for example, when liquid crystal polymers are employed, but in the technical practice only filler contents in the range of from 20 to 30% by weight are realized, it is possible with the present invention to increase the proportion of inorganic filler (A) to ranges which cannot be reached with the usual "permanently solid" fillers (A) due to the usual increase of viscosity of the polymer melt with increasing filler content. The highly heat-resistant moldings of vehicle lamps or headlamps obtainable according to the present invention primarily include headlamp reflectors, lamp sockets and shaders.

Another embodiment of the present invention pertains to a process for the preparation of the above described moldings wherein a mixture of a solid inorganic filler (A) which is liquid at the molding temperature and solid at operating temperature, and a thermoplastic binder (B) is prepared for injection-molding and/or transfer molding in the usual way.

Under the action of high shear forces, in particular when very short molding times in the range of 1 s or less are employed, it is possible to prepare complete headlamp reflectors according to the present invention which are suited for direct metal-coating without prior intermediate coating. Due to the high shear load during injection-molding and/or transfer molding, a very small particle size in the range of from 1 to 5 $\mu$m is achieved so that no homogeneous melt can form in the subsequent cooling phase. Due to the small particle size, however, a very smooth surface will form which is apt to be directly metal-coated.

Particularly preferred are molding times in the range of less than 0.2 s since particularly high shear forces will occur in this case resulting in a particularly smooth surface of the moldings. Preferably, the molding temperature is adjusted within the range of 20 to 100 K, in particular 40 to 70 K, above the melting range of the filler (A). Of course, further preconditions for adjusting an optimum molding temperature include, in addition to the melting range of the filler (A), the heat resistance of the thermoplastic binder (B).

We claim:

1. A molded article comprising:

an inorganic filler (A) which is liquid at the molding temperature and solid at room temperature; and a thermoplastic binder (B), said molded article comprising from 70 to 95% by weight of filler (A);

wherein said molded article is produced by a process selected from the group consisting of injection molding and transfer molding, said molded article being adapted for use in a vehicle as a headlamp reflector, lamp socket, shader of vehicle lamp, or vehicle headlamp.

2. The molded article according to claim 1, characterized in that said filler (A) has a density at 20° C. of at least 3 g/cm$^3$.

3. The molded article according to claim 1, characterized in that said filler (A) is selected from inorganic materials which are low-melting and glassy and inorganic materials which will solidify to a crystalline state.

4. The molded article according to claim 3, characterized in that said filler is selected from low-melting glasses, metals, metal alloys, and combinations thereof.

5. The molded article according to claim 4, characterized in that said low-melting inorganic glass has a melting range within the range of from 230 to 450° C.

6. The molded article according to claim 5, characterized in that said glass has an alkali metal zinc pyrophosphate structure or a zinc sulfide glass structure.

7. The molded article according to claim 1, characterized in that said thermoplastic binder (B) is selected from liquid crystal polymers (LCP), linear cellulose propionate (LCD), polyether ketones (PEK), polyetherether ketones (PEEK), polyether sulfones (PES), polyether imides (PEI) and polyphenylene sulfides (PPS).

8. The molded article according to claim 1, characterized in that said filler (A) has a coefficient of thermal expansion of less than or equal to $30\times10^{-6}$/K.

9. The molded article according to claim 2, characterized in that said filler (A) is selected from inorganic materials which are low-melting and glassy and inorganic materials which will solidify to a crystalline state.

10. The molded article according to claim 4, characterized in that said low-melting inorganic glass has a melting range within the range of from 320 to 350° C.

* * * * *